US012637051B2

(12) United States Patent (10) Patent No.: US 12,637,051 B2
Wald et al. (45) Date of Patent: May 26, 2026

(54) HYDRAULIC CONTROL UNIT AND HYDRAULIC MOTOR VEHICLE BRAKING SYSTEM

(71) Applicant: ZF Active Safety GmbH, Koblenz (DE)

(72) Inventors: Thomas Wald, Hollnic (DE); Tobias Boettcher, Nickenich (DE)

(73) Assignee: ZF Active Safety GmbH, Kobienz (DE)

( * ) Notice: Subject to any disclaimer, the term of this patent is extended or adjusted under 35 U.S.C. 154(b) by 554 days.

(21) Appl. No.: 17/980,297

(22) Filed: Nov. 3, 2022

(65) Prior Publication Data

US 2023/0137126 A1 May 4, 2023

(30) Foreign Application Priority Data

Nov. 4, 2021 (DE) .......................... 102021128767.7

(51) Int. Cl.
B60T 13/14 (2006.01)
B60T 8/36 (2006.01)
B60T 13/68 (2006.01)
B60T 17/06 (2006.01)
B60T 11/26 (2006.01)

(52) U.S. Cl.
CPC ............ B60T 13/142 (2013.01); B60T 8/368 (2013.01); B60T 13/686 (2013.01); B60T 17/06 (2013.01); B60T 11/26 (2013.01); *B60T 2270/413* (2013.01)

(58) Field of Classification Search
CPC ........ B60T 8/368; B60T 8/3685; B60T 11/26; B60T 13/14; B60T 13/142; B60T 13/148; B60T 17/02; B60T 17/06

USPC ....................................................... 303/DIG. 10
See application file for complete search history.

(56) References Cited

U.S. PATENT DOCUMENTS

| | | | | |
|---|---|---|---|---|
| 6,102,494 A | * | 8/2000 | Volz .......................... | B60T 8/368 303/DIG. 10 |
| 6,142,751 A | * | 11/2000 | Krauter ................... | B60T 8/368 417/415 |
| 6,390,133 B1 | * | 5/2002 | Patterson ................. | F15B 1/04 138/30 |
| 6,478,554 B1 | * | 11/2002 | Dinkel ...................... | F15B 1/26 417/313 |
| 6,634,386 B1 | | 10/2003 | Maloney et al. | |
| 7,118,183 B2 | * | 10/2006 | Hinz ........................ | B60T 8/368 303/DIG. 10 |
| 7,121,635 B2 | * | 10/2006 | Kondo .................... | B60T 8/368 303/DIG. 10 |
| 7,866,764 B2 | * | 1/2011 | Crimpita ............... | B60T 13/686 303/DIG. 10 |

(Continued)

FOREIGN PATENT DOCUMENTS

DE          874411 C          4/1953

*Primary Examiner* — Thomas J Williams
(74) *Attorney, Agent, or Firm* — Kristin L. Murphy

(57) ABSTRACT

A hydraulic control unit for a vehicle, including a hydraulic fluid reservoir with a hydraulic fluid reservoir space, out of which a hydraulic pressure generator is able to suction hydraulic fluid, an air space and a piston movingly accommodated in the hydraulic fluid reservoir, which separates the hydraulic fluid reservoir space and the air space from each other, wherein the air space is connectable and/or connected to an interior space of the hydraulic control unit, and a hydraulic motor vehicle braking system.

24 Claims, 6 Drawing Sheets

(56) References Cited

U.S. PATENT DOCUMENTS

| | | | | |
|---|---|---|---|---|
| 8,316,891 | B2 * | 11/2012 | Koyama | B60T 13/145 |
| | | | | 138/31 |
| 8,864,246 | B2 * | 10/2014 | Kodama | B60T 8/3685 |
| | | | | 303/DIG. 10 |
| 9,073,526 | B2 * | 7/2015 | Kodama | B60T 8/368 |
| 2001/0002236 | A1 * | 5/2001 | Mohr | B60T 8/4081 |
| | | | | 417/118 |
| 2004/0104617 | A1 * | 6/2004 | Noda | B60T 8/368 |
| | | | | 303/3 |
| 2004/0244371 | A1 * | 12/2004 | Takumori | B60T 8/3685 |
| | | | | 60/591 |
| 2023/0137126 | A1 * | 5/2023 | Wald | B60T 13/686 |
| | | | | 303/119.1 |

* cited by examiner

HYDRAULIC CONTROL UNIT AND HYDRAULIC MOTOR VEHICLE BRAKING SYSTEM

CROSS-REFERENCE TO RELATED APPLICATION

This application claims priority to German Priority Application No. 102021128767.7, filed Nov. 4, 2021, the disclosure of which is incorporated herein by reference in its entirety.

TECHNICAL FIELD

The disclosure relates to a hydraulic control unit for a vehicle. Moreover, the disclosure relates to a hydraulic motor vehicle braking system.

BACKGROUND

Hydraulic control units usually include liquid reservoirs, which can make brake fluid available if necessary. In order to ensure an approximately uniform delivery rate, ventilation is necessary behind a piston unit of the liquid reservoir, otherwise an underpressure can arise, which prevents a complete emptying of the liquid reservoir. In order to achieve this pressure compensation, a direct connection to the surroundings conditions or to the atmosphere is usually established as the piston advances. As a result thereof, however, not only does the required ventilation take place, but an entry of, for example, dirt particles, such as water or salt water, also takes place. A utilisation of the hydraulic control unit in or under water is also not enabled as a result. Additionally, in the case of a temperature change (for example, temperature shock), a vacuum can arise between the piston unit and the end cap, which prevents the piston from moving and, thus, can prevent a braking function.

For example, U.S. Pat. No. 6,634,386 B1 describes a liquid reservoir for use in a vehicle anti-lock braking system. The hydraulic control unit includes a main body and the liquid reservoir mounted in the main body, wherein a sealing buffer is used for mounting the main body at a vehicle body. The sealing buffer establishes a venting path for the liquid reservoir toward the outside to the surroundings of the vehicle.

SUMMARY

What is needed is structurally and/or functionally improving an aforementioned hydraulic control unit, as well as structurally and/or functionally improving an aforementioned hydraulic motor vehicle braking system.

Disclosed herein is a hydraulic control unit (HCU) for a braking system. The hydraulic control unit and/or the braking system can be utilised or intended for a vehicle, such as a motor vehicle. The motor vehicle can be a passenger car or a truck. The braking system can be a vehicle braking system and/or a motor vehicle braking system, such as a hydraulic motor vehicle braking system. The hydraulic control unit can be an electrohydraulic control unit (ENCU). The hydraulic control unit can be an assembly, such as a hydraulic assembly.

The hydraulic control unit can include a hydraulic fluid reservoir. The hydraulic fluid reservoir can be a reservoir, such as an intermediate reservoir, for a hydraulic fluid, such as brake fluid. The hydraulic fluid reservoir can be an accumulator and/or a brake fluid reservoir.

The hydraulic fluid reservoir can include a hydraulic fluid reservoir space. The hydraulic fluid reservoir space can be a chamber, such as a fluid chamber or a hydraulic fluid reservoir space. The hydraulic fluid reservoir and/or hydraulic fluid reservoir space can be designed in such a way that a hydraulic pressure generator is able to suction hydraulic fluid out of the hydraulic fluid reservoir space. The hydraulic control unit and/or the braking system can include the hydraulic pressure generator. The hydraulic pressure generator can be an electrical hydraulic pressure generator. The hydraulic pressure generator can be a, for example, electrical, brake pressure generator for example, a second brake pressure generator of a second functional unit. The hydraulic pressure generator can be a fluid supply device. The hydraulic pressure generator can be or include an, electrical pump, such as a hydraulic pump and/or a piston pump and/or a radial piston pump and/or a gear pump and/or a multi-piston pump.

The hydraulic fluid reservoir can include an air space. The air space can be a chamber, such as an air chamber, a ventilation chamber, or an aeration chamber. The hydraulic fluid reservoir space and the air space can be separated from each other. The air space can be connectable and/or connected to an interior space of the hydraulic control unit. The hydraulic control unit can include and/or define the interior space. The interior space can be separated from the surroundings, for example, from the outer surroundings of the hydraulic control unit, such as the atmosphere, and/or dosed off from, such as hermetically sealed with respect to, the surroundings. The volume of the interior space can be greater than the volume of the air space.

The hydraulic fluid reservoir can include a piston. The piston can be an accumulator piston. The piston can be movably, for example, slidingly, accommodated in the hydraulic fluid reservoir. The piston can be, for example, slidingly, accommodated in the hydraulic fluid reservoir. The piston can be designed in such a way that the piston separates the hydraulic fluid reservoir space and the air space from each other. The piston can be cylindrical. The piston can be cup-shaped. The piston can have a first piston surface. The piston can have a second piston surface. The first piston surface can delimit the hydraulic fluid reservoir space at least in some areas. The second piston surface can delimit the air space at least in some areas. The piston can be designed in such a way that a displacement of the piston in a first direction enlarges the hydraulic fluid reservoir space and reduces the hydraulic fluid reservoir space in an opposite, second direction. The piston can be designed in such a way that a displacement of the piston in the first direction reduces the air space and enlarges the air chamber in the opposite, second direction. Due to the displacement of the piston in the first direction, hydraulic fluid can flow into the hydraulic fluid reservoir space, and so the hydraulic fluid reservoir space is filled with the hydraulic fluid. Due to the displacement of the piston in the second direction, hydraulic fluid can flow out of the hydraulic fluid reservoir space and/or air can flow and/or be suctioned into the air space from the interior space.

The hydraulic fluid reservoir can include at least one hydraulic fluid outlet. The at least one hydraulic fluid outlet can be assigned to and/or open into the hydraulic fluid reservoir space. Via the hydraulic fluid outlet, the hydraulic pressure generator can suction hydraulic fluid out of the hydraulic fluid reservoir space. The hydraulic pressure generator can be designed to provide the hydraulic fluid present in the hydraulic fluid reservoir space of the hydraulic fluid reservoir to the braking system or at least to a brake circuit, for example to generate a brake pressure at, at least one wheel brake. The hydraulic pressure generator can be designed to suction in the hydraulic fluid present in the hydraulic fluid reservoir space of the hydraulic fluid reservoir and feed the hydraulic fluid to at least one brake circuit in order to generator a brake pressure at, at least one wheel brake.

The hydraulic fluid reservoir can include a cap, such as an end cap. The air space can be delimited by the cap at least in some areas. The cap can be arranged at the side opposite the second piston face. The cap can be sealingly mounted. The cap can be plate-shaped. The hydraulic fluid reservoir can have an open side. The open side can be closed, for example tightly, by the cap.

The hydraulic fluid reservoir can include at least one ventilation inlet for ventilating the air space. The ventilation inlet can be assigned to the air space and/or open into the air chamber. The at least one ventilation inlet can be connectable and/or connected to the interior space of the hydraulic control unit, example, via a venting path and/or venting duct. The hydraulic control unit and/or the hydraulic fluid reservoir can be designed in such a way that air can flow out of the interior space of the hydraulic control unit into the air space of the hydraulic fluid reservoir. Due to a displacement of the piston of the hydraulic fluid reservoir, for example in the second direction, air can flow and/or be suctioned out of the interior space of the hydraulic control unit into the air space of the hydraulic fluid reservoir. The hydraulic fluid reservoir and/or the hydraulic control unit can be designed in such a way that air can flow, such as subsequently flow, out of the interior space into the air space.

The air space can be connectable and/or connected to the interior space of a housing of the hydraulic control unit, for example, via the at least one ventilation outlet. The air space can be connectable and/or connected to the interior space of a housing of an electric control unit of the hydraulic control unit, for example, via the at least one ventilation outlet. The hydraulic control unit can include the electric control unit. The electric control unit can be a control unit and/or an electronic controller. The electric control unit can be an electronic control unit (ECU). Additionally or alternatively, the air space can be connectable and/or connected to the interior space of a housing of a motor of the hydraulic control unit, for example, via the at least one ventilation outlet. The hydraulic control unit can include the motor. The motor can be an electric motor. The electric motor can be a DC motor. The motor can be a drive motor of the hydraulic pressure generator.

The hydraulic control unit can be a bore, such as an axial bore. The hydraulic control unit can include a body, such as a main body. The bore can be formed in the body of the hydraulic control unit. The piston of the hydraulic fluid reservoir can be movably, for example, slidingly, accommodated and/or mounted in the bore. The bore can delimit the hydraulic fluid reservoir space at least in some areas. The bore can delimit the air space at least in some areas.

The hydraulic control unit and/or the hydraulic fluid reservoir can include a cylinder. The cylinder can be mounted and/or arranged in the body, such as the main body, of the hydraulic control unit. The cylinder can be designed to accommodate hydraulic fluid. The piston of the hydraulic fluid reservoir can be movably, for example, slidingly, accommodated and/or mounted in the cylinder. The cylinder can delimit the hydraulic fluid reservoir space at least in some areas. The cylinder can delimit the air space at least in some areas.

The hydraulic fluid reservoir can include a sealing element. The piston of the hydraulic fluid reservoir can be sealed with respect to the bore and/or the cylinder via or by the sealing element. The sealing element can be designed to seal the hydraulic fluid reservoir space and the air space with respect to each other. The sealing element can be designed to seal in a fluid-tight manner. The sealing element can be ring-shaped. The sealing element can be designed as an annular seal. The sealing element can include a circumferential sealing lip. The piston of the hydraulic fluid reservoir can include a groove, such as a circumferential groove. The sealing element can be effectively arranged in the groove of the piston, at least in some areas. The sealing lip of the sealing element can protrude over the circumference/circumferential surface of the piston, at least in some areas.

The piston can be designed to separate the air space from the interior space of the hydraulic control unit, for example, to close the at least one ventilation outlet, in a position of the piston, for example, the rearward position of the piston, such as the hydraulic fluid reservoir position and/or end position. This position can be the end position in the direction of the first direction. The hydraulic fluid reservoir can be in a condition in which the hydraulic fluid reservoir is filled and/or charged with hydraulic fluid. In the filled and/or charged condition, the hydraulic fluid reservoir space can be filled with hydraulic fluid and/or hydraulic fluid can be stored, such as reserved, in the hydraulic fluid reservoir space. In the filled and/or charged condition, the piston can rest against the cap and/or against a support element, such as a support ring. The hydraulic fluid reservoir can include the support element. In the filled and/or charged condition, the piston can be positioned and/or designed in such a way that the at least one ventilation outlet is closed.

The piston can be designed to connect the air space to the interior space of the hydraulic control unit by means of an axial movement of the piston, for example, a movement to empty and/or discharge the hydraulic fluid present in the hydraulic fluid reservoir space. The movement to empty and/or discharge the hydraulic fluid present in the hydraulic fluid reservoir space can take place in the direction of the second direction. Due to the movement, the piston can be or will be positioned in such a way that the at least one ventilation outlet is opened.

The hydraulic fluid reservoir can be or will be acted upon, for example, by suctioning in the hydraulic fluid by the hydraulic pressure generator. The hydraulic fluid reservoir can be designed in such a way that the piston is or will be, for example, exclusively, acted upon by suctioning in the hydraulic fluid by the hydraulic pressure generator. The hydraulic fluid reservoir can be or will be acted upon exclusively by atmospheric pressure. The hydraulic fluid reservoir can be designed in such a way that the piston is or will be, for example, exclusively, acted upon by atmospheric pressure. The hydraulic fluid reservoir can be designed as a fluid reservoir, such as a low-pressure reservoir, that is not acted upon by spring force. The hydraulic fluid reservoir can be designed in such a way that the hydraulic fluid reservoir and/or the piston are/is pressureless in the filled and/or charged condition. The piston of the hydraulic fluid reservoir can be a pressureless piston and/or can be designed in this way.

The hydraulic control unit can include a venting path. The venting path can be connectable and/or connected, on the one hand, to the air space, for example, to the at least one ventilation outlet of the air chamber. The venting path can open into the air space. The venting path can be connectable and/or connected, on the other hand, to the interior space, for example, to the interior space of the housing of the electric control unit and/or to the interior space of the housing of the motor. The venting path can open into the interior space of the housing of the hydraulic control unit. The venting path can open into the interior space of the housing of the electric control unit and/or into the interior space of the housing of the motor. The air space can be connected to the interior space via the venting path.

The interior space, for example the interior space of the housing of the electric control unit and/or the interior space of the housing of the motor, can be separated from the surroundings, for example, from the atmosphere surrounding the hydraulic control unit, and/or closed off from, such as hermetically sealed with respect to, the surroundings, Additionally, or alternatively, the electric control unit and/or the housing of the electric control unit can include an air-permeable diaphragm.

The hydraulic control unit can include at least one duct, such as a duct bore. The at least one duct can open, on the one hand, into the air space. The at least one duct can open, on the other hand, into a supply path, such as a supply duct. The supply path can extend between the interior space of the housing of the electric control unit and the interior space of the housing of the motor and connect these to each other. The supply path can open, on the one hand, into the interior space of the electric control unit and, on the other hand, into the interior space of the housing of the motor. The supply path can be utilised for the electrical supply and/or control of the motor. The supply path can be designed in such a way that supply lines, such as power lines and/or control lines, can extend from the electric control unit to the motor. A gap, such as an annular gap, can be formed between the supply lines and the supply path/duct. The at least one duct can open into the gap.

At least one sealing element can be effectively arranged in the supply path. The at least one sealing element can be designed to seal in a fluid-tight manner. The at least one sealing element can be ring-shaped. The at least one sealing element can be an annular seal and/or an O-ring. For example, a sealing element can be effectively arranged in a first path section of the supply path. The first path section can be provided and extend between the mouth of the at least one duct and the interior space of the housing of the electric control unit. The sealing element can be designed to seal the air space and the interior space of the housing of the electric control unit with respect to each other. Additionally or alternatively, a sealing element can be effectively arranged in a second path section of the supply path. The second path section can be provided and extend between the mouth of the at least one duct and the interior space of the housing of the electric control unit. The sealing element can be designed to seal the air space and the interior space of the housing of the motor with respect to each other, A hydraulic motor vehicle braking system can be for a vehicle, such as a motor vehicle. The motor vehicle can be a passenger car or a truck. The vehicle and/or the motor vehicle braking system can include wheel brakes, such as front wheel brakes and/or rear wheel brakes. The motor vehicle braking system can include a hydraulic control unit. The hydraulic control unit can be designed as described above and/or in the following.

The hydraulic motor vehicle braking system can be for and/or include and/or be designed for a redundant brake pressure control.

The motor vehicle braking system can include a first functional unit. The first functional unit can include a first, for example, electric, brake pressure generator. The first brake pressure generator of the first functional unit can be designed to generate a brake pressure at each of a plurality of wheel brakes, for example, at each of all wheel brakes. The first functional unit can include a brake cylinder that is couplable or coupled to a brake pedal.

The motor vehicle braking system can include a second functional unit. The second functional unit can be designed to lead through a brake pressure at each wheel brake of the plurality of wheel brakes redundantly with respect to the first functional unit. The second functional unit can include the hydraulic control unit, which is described above and/or in the following.

The two functional units can be logically and/or physically separated from each other. Functional units that are physically separated from one another can be accommodated in different housings or housing parts at least with respect to some of their components. The different housings or housing parts can be attached to one another directly, i.e., at least approximately without spacing, and, thus, can be considered as two housing parts of a higher-order overall housing.

With the disclosure, the inner area can be separated from the surroundings conditions also during the piston travel. An entry of, for example, water or salt water, is avoided. Simultaneously, it can be ensured that the hydraulic pressure generator, such as a pump, can be able to access the volume, such as the hydraulic volume or hydraulic fluid, also after a temperature shock; for example when a sufficiently large connecting volume has been selected. It can be achieved that the pressure drop behind the piston has no significant effect on the delivery rate of the hydraulic pressure generator. The delivery rate of the hydraulic pressure generator can be improved. Pressure differences, also with respect to the surroundings and/or due to temperature changes or altitude changes, can be compensated for. The hydraulic control unit can be actuated and used in and/or under water, for example due to the separation into an inner area and an outer area. Fewer parts are required. The assembly effort can be reduced. The costs can be reduced.

BRIEF DESCRIPTION OF DRAWINGS

Exemplary arrangements of the disclosure are described in greater detail in the following with reference to figures. Schematically and by way of example.

DETAILED DESCRIPTION

Figures 1, 2:
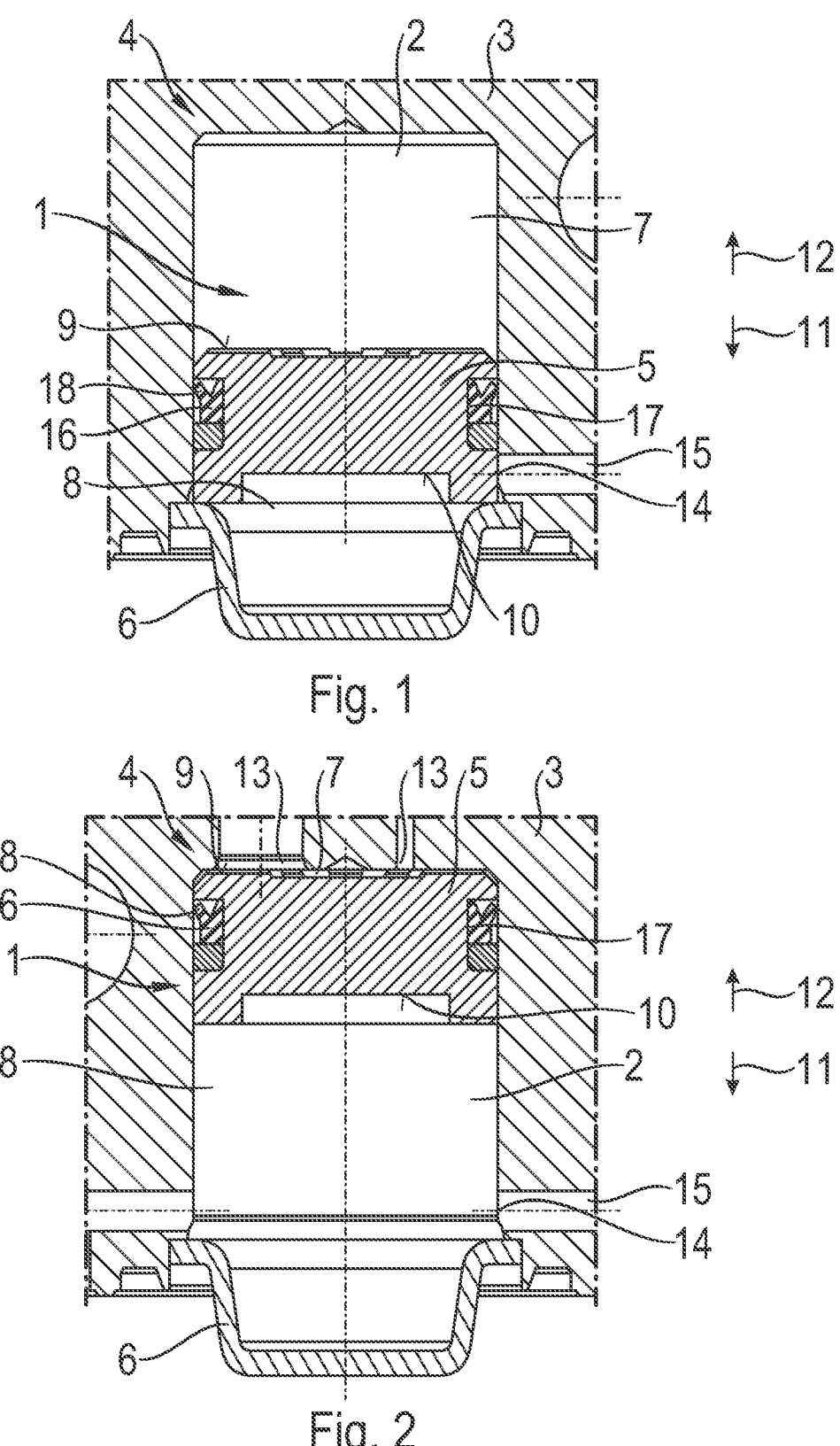
FIG. 1 shows a hydraulic fluid reservoir in a filled/charged condition.
FIG. 2 shows the hydraulic fluid reservoir according to FIG. 1 in the emptied/discharged condition.

FIG. 1 schematically shows a hydraulic fluid reservoir 1 in a filled/charged condition. The hydraulic fluid reservoir 1 is formed by a cylindrical bore 2 in a body 3 of a hydraulic control unit 4. A piston 5 is movably and slidingly accommodated in the bore 2. The bore is closed toward one side and open toward the opposite side. An end cap 6 is sealingly mounted at the open side.

The hydraulic fluid reservoir 1 includes a hydraulic fluid reservoir space 7 and an air space 8, The hydraulic fluid reservoir space 7 and the air space 8 are separated from each other by the piston 5. The piston 5 has a first piston surface 9 and a second piston surface 10. The first piston surface 9 delimits the hydraulic fluid reservoir space 7 at least in some areas. The second piston surface 10 delimits the air space 8 at least in some areas. The hydraulic fluid reservoir space 7 is delimited by the first piston surface 9 of the piston 7 and the bore 2. The air space 8 is delimited by the second piston surface 9 of the piston 7, the bore 2, and the end cap 6. Moreover, the piston 5 is designed in such a way that a displacement of the piston 5 in a first direction 11 enlarges the hydraulic fluid reservoir space 7 and reduces the air space 8 and a displacement of the piston 5 in a second direction 12 reduces the hydraulic fluid reservoir space 7 and enlarges the air chamber 8.

The hydraulic fluid reservoir 1 can include at least one hydraulic fluid outlet 13 see FIG. 2). The at least one hydraulic fluid outlet 13 is assigned to the hydraulic fluid reservoir space and opens into the hydraulic fluid reservoir space. Via the hydraulic fluid outlet 13, a hydraulic pressure generator (not represented) can suction hydraulic fluid out of the hydraulic fluid reservoir space 7, as the result of which the piston 5 moves, for example is displaced in the second direction 12.

The hydraulic fluid reservoir 1 can include at least one ventilation inlet 14, in particular for ventilating the air space 8. The ventilation inlet 14 is assigned to the air space 8 and opens into the air space 8. The ventilation inlet 14 is connectable and/or connected via the venting duct 15 to an interior space of the hydraulic control unit 4. The hydraulic fluid reservoir 1 is designed in such a way that air can flow out of the interior space of the hydraulic control unit 4 into the air space 8 of the hydraulic fluid reservoir 1. Due to a displacement of the piston 5 of the hydraulic fluid reservoir 1 in the second direction 12, air can flow and/or be suctioned out of the interior space of the hydraulic control unit 4 via the venting duct 15 into the air space 8 of the hydraulic fluid reservoir 1. The interior space of the hydraulic control unit 4 can be an interior space of a housing of an electric control unit of the hydraulic control unit 4 and/or an interior space of a housing of a motor of the hydraulic control unit 4.

The hydraulic fluid reservoir 1 also includes a sealing element 16, via which the piston 5 of the hydraulic fluid reservoir 1 is sealed with respect to the bore 2. The sealing element 16 is designed for the purpose of fluidically sealing the hydraulic fluid reservoir space 7 and the air space 8 with respect to each other. The piston 5 has a circumferential groove, in which the sealing element 16 is effectively arranged. The sealing element 16 includes a circumferential sealing lip 18, which protrudes over the circumferential surface of the piston, at least in some areas, and sealingly rests against the inner wall of the bore 2.

In FIG. 1, the piston 5 is in its rearward position, such as the hydraulic fluid reservoir position and/or end position, and so the hydraulic fluid reservoir space 7 is filled with hydraulic fluid. The hydraulic fluid reservoir 1 is in a condition in which the hydraulic fluid reservoir 1 is filled and/or charged with hydraulic fluid. In the filled and/or charged condition, the piston 5 rests against the end cap 6 and closes the ventilation outlet 14, as the result of which the air space 8 is separated from the interior space of the hydraulic control unit.

FIG. 2 schematically shows the hydraulic fluid reservoir 1 according to FIG. 1 in an emptied/discharged condition.

The piston 5 is designed in such a way that the piston 5 connects the air space 8 to the interior space of the hydraulic control unit due to an axial movement of the piston 5 in the second direction 12 to empty and/or discharge the hydraulic fluid present in the hydraulic fluid reservoir space 7. Due to the movement of the piston 5 in the second direction 12, the piston 5 is positioned in such a way that the ventilation outlet 14 is opened and air can flow out of the interior space of the hydraulic control unit 4 into the air space 8. As a result, the underpressure in the air space 8 caused by the piston movement can be compensated for, but at least reduced.

Due to the increase in volume achieved as a result, the underpressure in the air space 8 does not become so great upon actuation of the piston 5 that the hydraulic pressure generator could no longer approximately completely convey the hydraulic fluid out of the hydraulic fluid reservoir space 7.

For the rest, reference is also made to FIG. 1 and the associated description.

Figure 3:
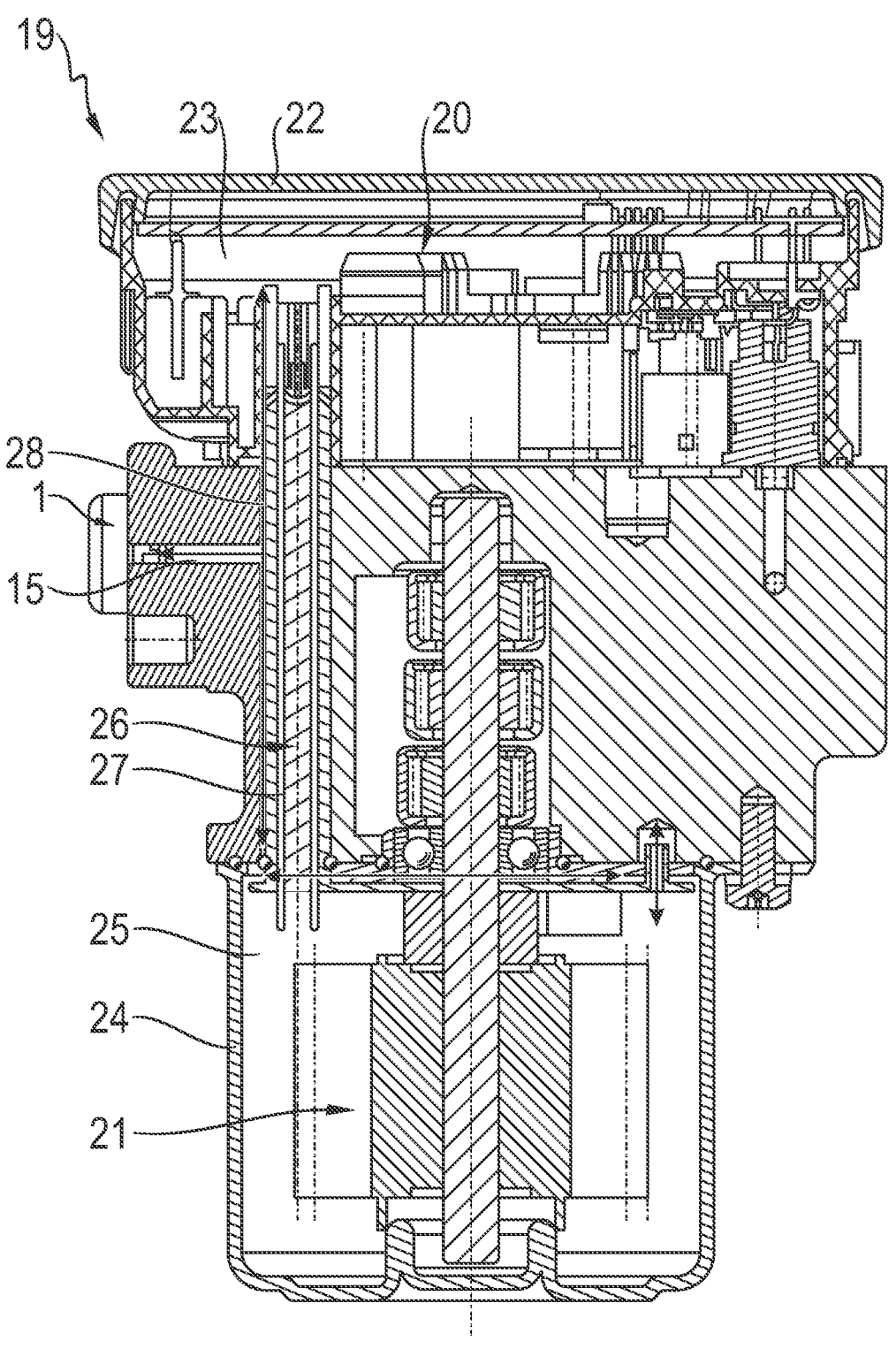
FIG. 3 shows a variant of a hydraulic control unit.

FIG. 3 schematically shows an exemplary variant of a hydraulic control unit 19 that includes an electric control unit 20 and an electric motor 21.

The electric control unit 20 includes a housing 22, which defines an interior space 23. The electric motor 21 is located in a motor housing 24, which defines an interior space 25. Both the interior space 23 of the housing 22 of the electric control unit 20 and the interior space 25 of the motor housing 24 are separated from the surroundings, from the atmosphere surrounding the hydraulic control unit 19, and are dosed off from, such as hermetically sealed with respect to, the surroundings.

The hydraulic control unit 19 includes a supply duct 26 for the electrical supply and/or control of the electric motor 21. The supply duct 26 connects the interior space 23 of the housing 22 of the electric control unit 20 to the interior space 25 of the motor housing 24. Supply lines 27, such as power lines and/or control lines, extend through the supply duct 26. A gap 28, such as an annular gap, is formed between the supply lines 27 and the supply duct.

The hydraulic control unit 19 also includes the hydraulic fluid reservoir 1 according to FIGS. 1 and 2, wherein the venting duct 15, on the one hand, opens into the air space 8 and, on the other hand, opens into the supply duct 26 and the gap 28. As a result, the air space 8 can be connected to the interior space 23 of the housing 22 of the electric control unit 20 and to the interior space 25 of the motor housing 24. Consequently, a direct path is established into the housing 22 of the electric control unit 20 and into the motor housing 24. The arrows represented in FIG. 3 illustrate a possible air flow between the air space 8 of the hydraulic fluid reservoir 1 and the interior space 23 of the housing 22 of the electric control unit 20 and the interior space 25 of the motor housing 24.

For the rest, reference is also made to FIGS. 1 and 2 and the associated description.

Figure 4:
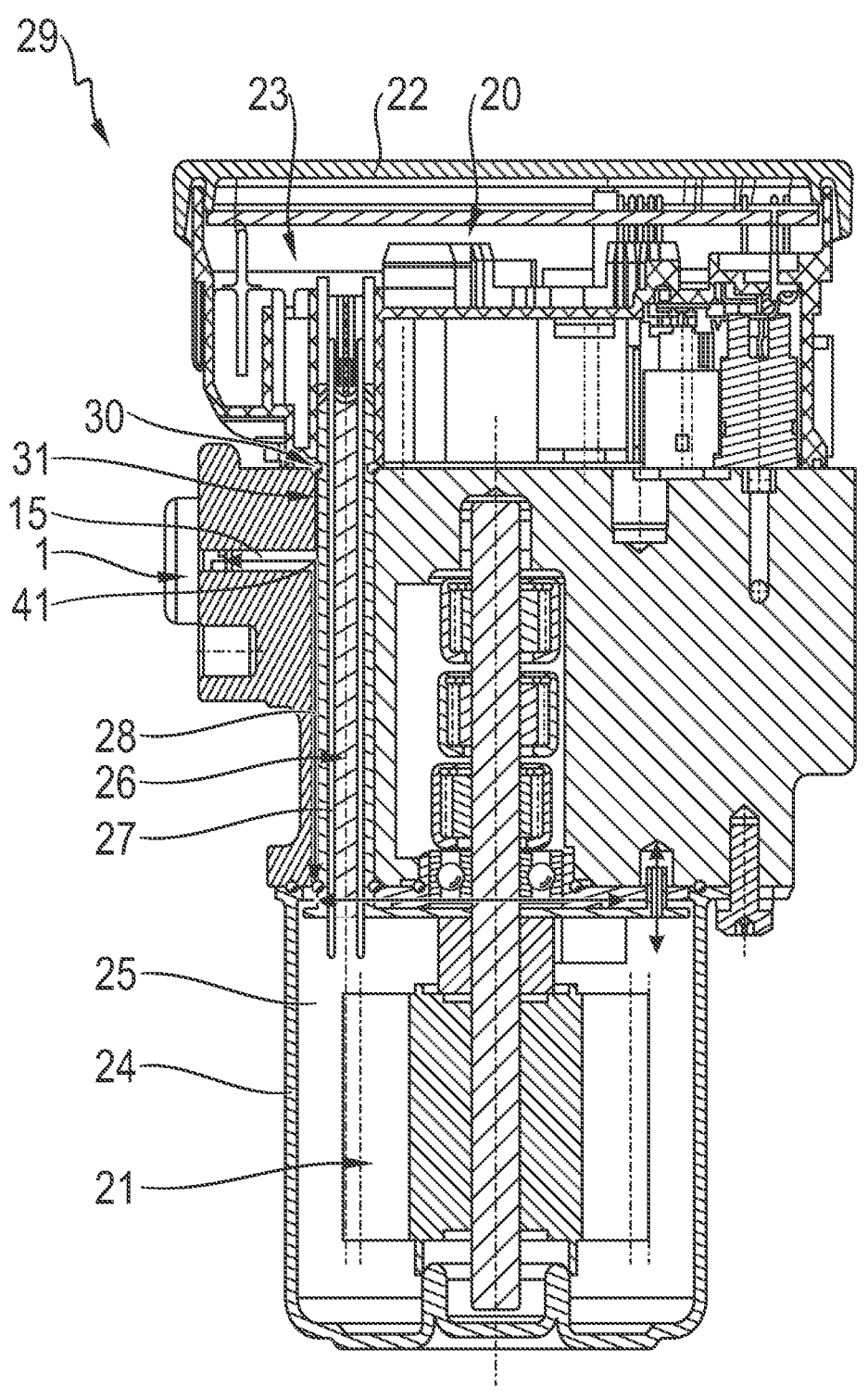
FIG. 4 shows another variant of a hydraulic control unit.

FIG. 4 schematically shows another exemplary variant of a hydraulic control unit 29. The hydraulic control unit 29 corresponds to the hydraulic control unit 19 according to FIG. 3.

In contrast, the hydraulic control unit 29 of the present exemplary arrangement includes a sealing element 30, which is effectively arranged in a first path section 31 of the supply duct 26. The first path section 31 extends between the mouth 41 of the venting duct 15 and the interior space 23 of the housing 22 of the electric control unit 20. The sealing element 30 is designed to seal the air space 8 and the interior space 23 of the housing 22 of the electric control unit 20 with respect to each other. Therefore, air can flow only between the air space 8 of the hydraulic fluid reservoir 1 and the interior space 25 of the motor housing 24.

The arrows represented in FIG. 4 illustrate a possible air flow between the air space 8 of the hydraulic fluid reservoir 1 and the interior space 25 of the motor housing 24.

For the rest, reference is also made, in particular, to FIGS. 1 through 3 and the associated description.

Figure 5:
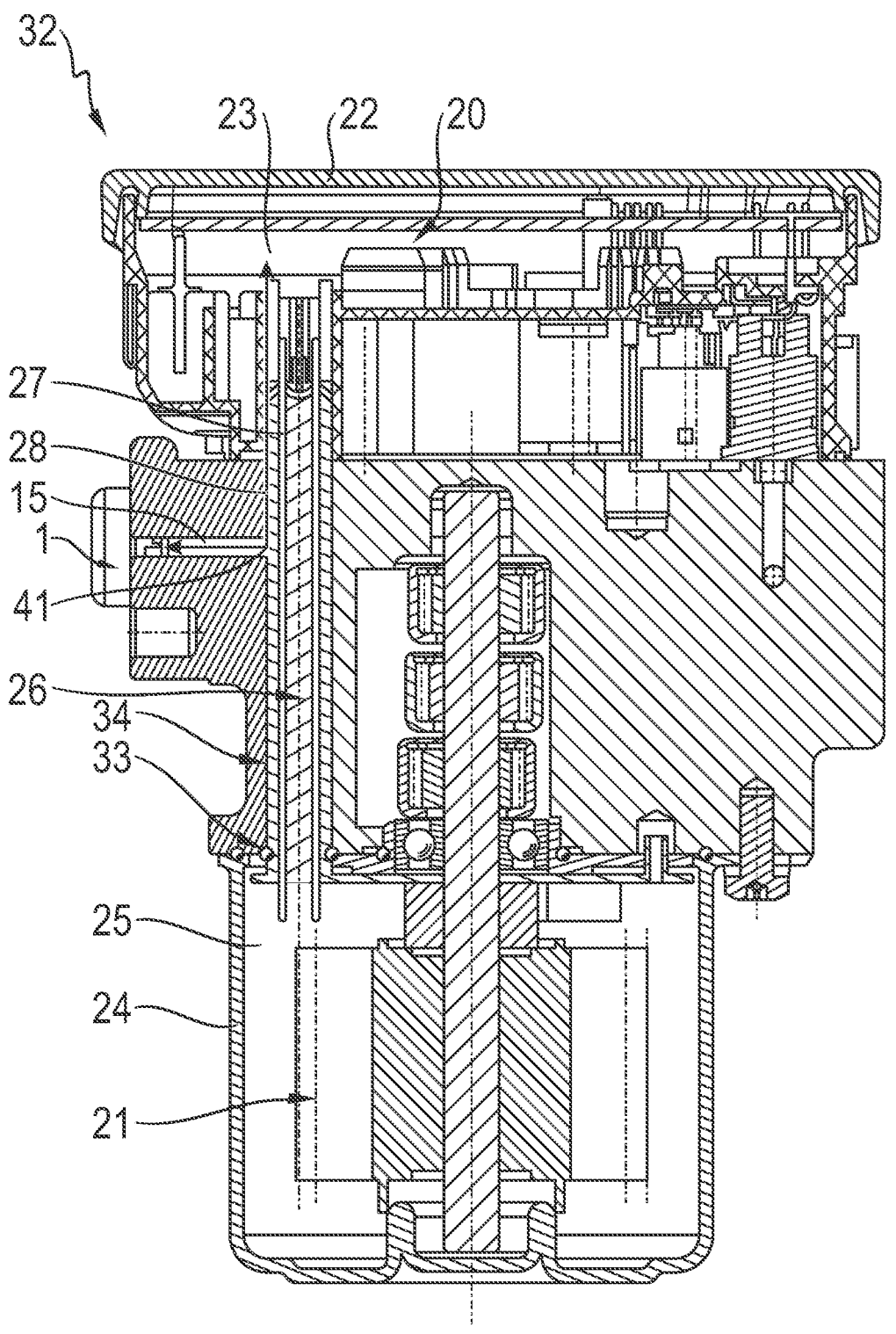
FIG. 5 shows another variant of a hydraulic control unit.

FIG. 5 schematically shows another variant of a hydraulic control unit 32. The hydraulic control unit 32 essentially corresponds to the hydraulic control unit 19 according to FIG. 3.

In contrast, the hydraulic control unit 32 of the present exemplary arrangement includes a sealing element 33, which is effectively arranged in a second path section 34 of the supply duct 26. The second path section 34 extends between the mouth 41 of the venting duct 15 and the interior space 25 of the housing 24 of the electric motor 21. The sealing element 33 is designed to seal the air space 8 and the interior space 25 of the housing 24 of the electric control unit 21 with respect to each other. Therefore, air can flow only between the air space 8 of the hydraulic fluid reservoir 1 and the interior space 23 of the electric control unit 20.

The arrows represented in FIG. 5 illustrate a possible air flow between the air space 8 of the hydraulic fluid reservoir 1 and the interior space 23 of the housing 22 of the electric control unit 20.

For the rest, reference is also made to FIGS. 1 through 4 and the associated description.

Figure 6:
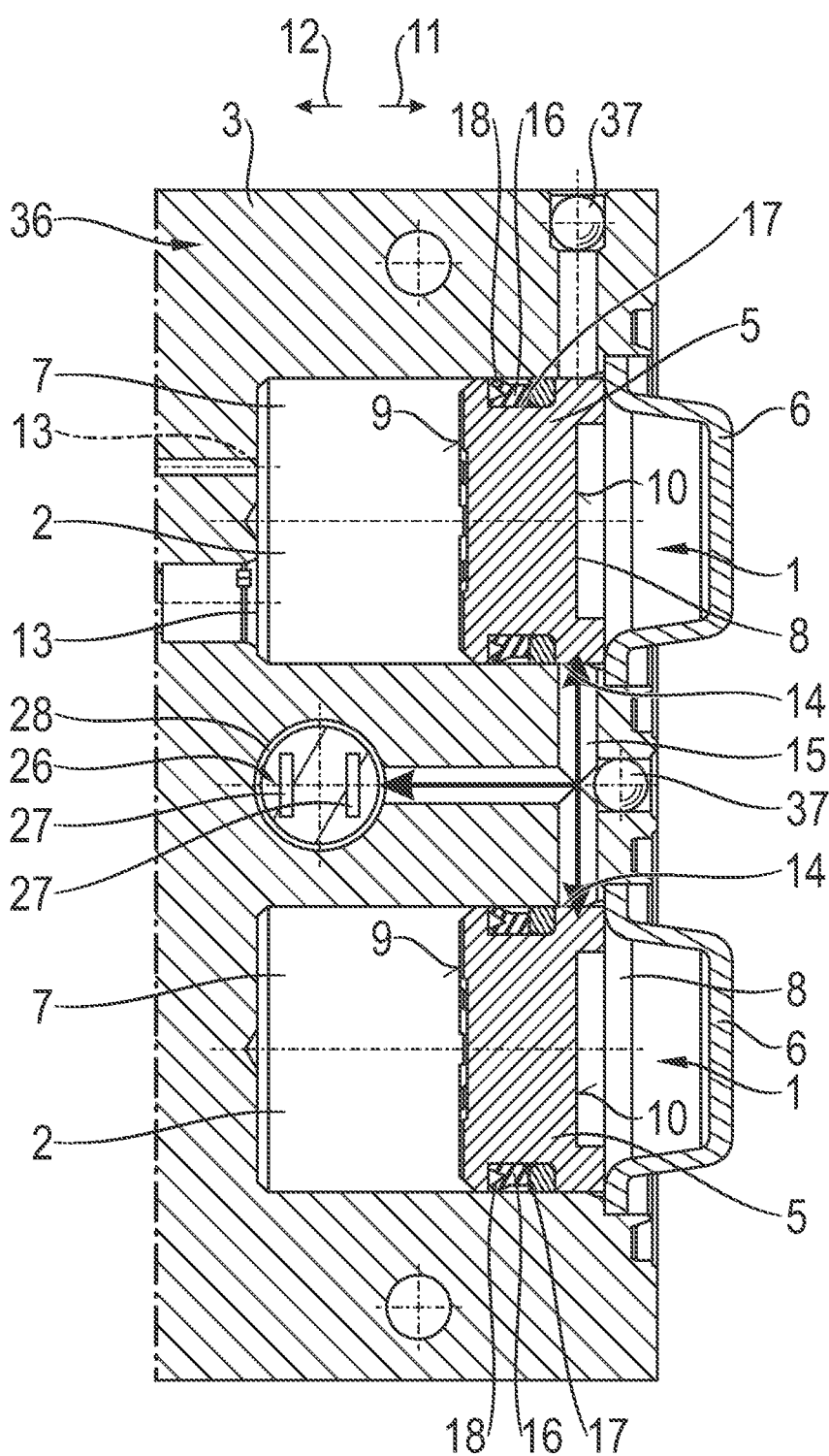
FIG. 6 shows another variant of a hydraulic control unit.

FIG. 6 schematically shows another variant of a hydraulic control unit 36 that includes a first variant of an approach to a bore hole. The hydraulic control unit 36 can be designed essentially similar to one of the hydraulic control units described with respect to FIGS. 1 through 5.

The hydraulic control unit 36 includes two hydraulic fluid reservoirs 1 according to FIGS. 1 and 2. The two hydraulic fluid reservoirs 1 are connected to the venting duct 15 via their ventilation inlets 14. The venting duct 15 is designed to be essentially T-shaped and opens into the gap 28 of the supply duct 26. Moreover, the venting duct 15 connects the air ducts 8 of the two hydraulic fluid reservoirs 1 to each other.

Certain sections of the venting duct 15 for example sections that do not open directly into the gap 28 of the supply duct 26 or establish an opening to the outer surroundings, are closed with blocking elements 37, such as balls 37. As a result, it can be ensured that an access to the outer surroundings of the hydraulic control unit 36 is not present.

The arrows represented in FIG. 6 illustrate a possible air flow between the air chambers 8 of the two hydraulic fluid reservoirs 1 and the interior space 23 of the housing 22 of the electric control unit 20 and/or the interior space 25 of the motor housing 24 of the electric motor 21.

For the rest, reference is also made to FIGS. 1 through 5 and the associated description.

Figure 7:
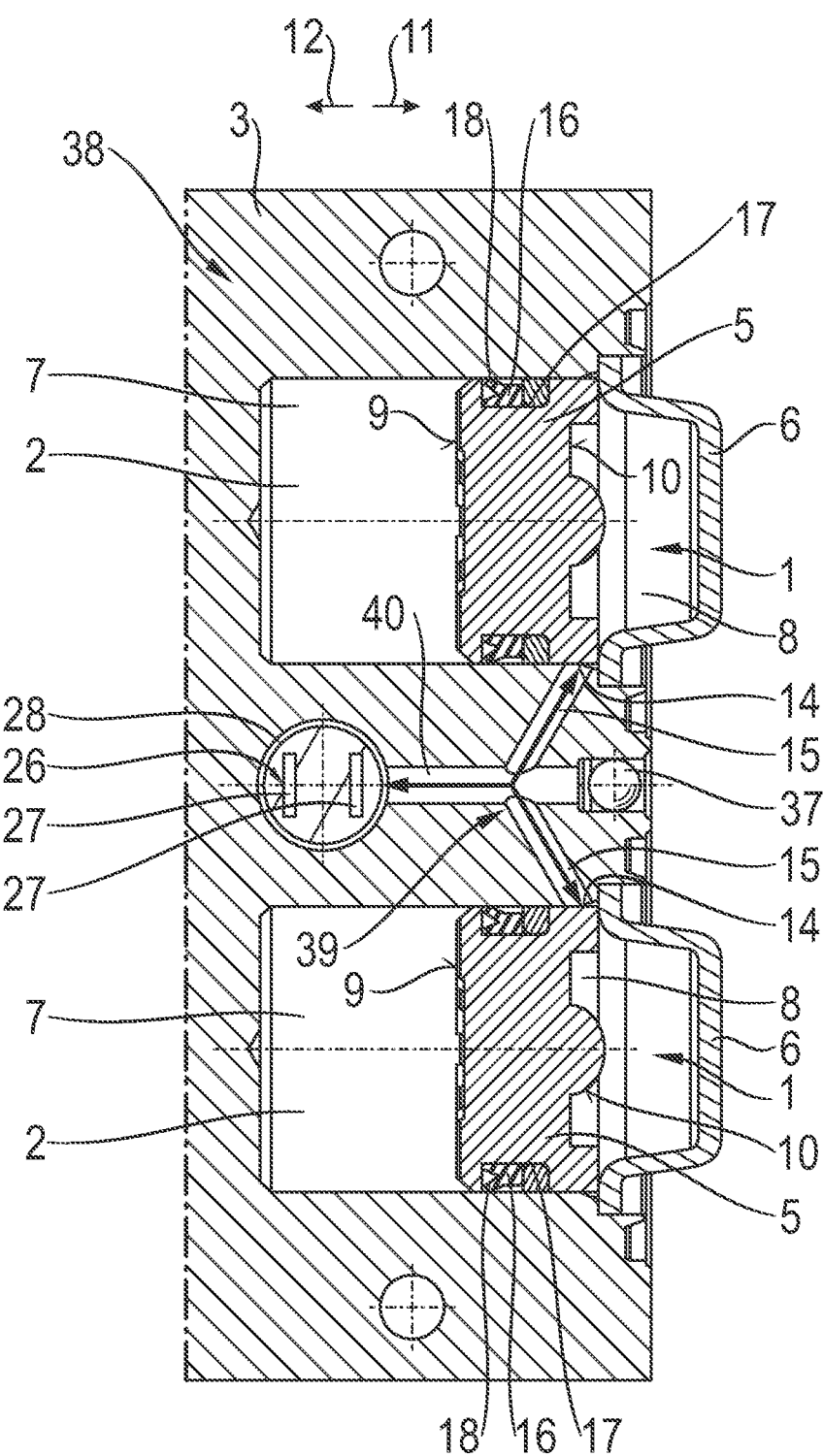
FIG. 7 shows another variant of a hydraulic control unit.

FIG. 7 schematically shows another exemplary variant of a hydraulic control unit 38 that includes a second variant of an approach to a bore hole. The hydraulic control unit 38 can be designed similar to one of the hydraulic control units described with respect to FIGS. 1 through 6. For example, the hydraulic control unit 38 corresponds to the hydraulic control unit 36 according to FIG. 6, but has one other bore hole.

As shown in FIG. 7, the hydraulic control unit 38 includes two oblique, duct bores, such as venting ducts 15. The two duct bores 15 meet at an LPA bore chamfer 39 and/or open into the LPA bore chamfer 39. The two duct bores 15 are connected to another duct bore 40, which opens into the gap 28 of the supply duct 26.

The arrows represented in FIG. 7 illustrate a possible air flow between the air chambers 8 of the two hydraulic fluid reservoirs 1 and the interior space 23 of the housing 22 of the electric control unit 20 and/or the interior space 25 of the motor housing 24 of the electric motor 21.

For the rest, reference is also made to FIGS. 1 through 6 and the associated description.

Optional features of the disclosure are designated with "can." Consequently, there are also refinements and/or exemplary arrangements of the disclosure that additionally or alternatively have the particular feature or the particular features.

Isolated features can also be extracted from the combinations of features disclosed in the present case as necessary, and, while resolving a structural and/or functional correlation possibly existing between the features, used in combination with other features to demarcate the subject matter of the claim,

The invention claimed is:

1. A hydraulic control unit for a vehicle, comprising: a hydraulic fluid reservoir with a hydraulic fluid reservoir space, out of which a hydraulic pressure generator is able to suction hydraulic fluid, an air space and a piston movingly accommodated in the hydraulic fluid reservoir, which separates the hydraulic fluid reservoir space and the air space from each other, wherein the piston defines a first piston surface and a second piston surface, wherein the air space is connectable and/or connected to an interior space of the hydraulic control unit; and wherein the second piston surface is defined by a circumferential flange extending downwardly from a peripheral section of the piston, wherein the circumferential flange serves to block the air space from connecting to the interior space of the hydraulic control unit when the hydraulic control unit is in a charged condition, while air is trapped between the second piston surface and an end cap, wherein a base surface of the end cap extends beyond a surface of a body of the hydraulic control unit, wherein the hydraulic fluid reservoir is a low-pressure reservoir that is not acted upon by any spring force, and wherein the air space and the interior space are hermetically sealed from a surrounding atmosphere by a sealing element such that the hydraulic control unit remains operational when submerged.

2. The hydraulic control unit according to claim 1, wherein the first piston surface delimits the hydraulic fluid reservoir space and the second piston surface delimits the air space.

3. The hydraulic control unit according to claim 1, wherein the hydraulic fluid reservoir includes at least one hydraulic fluid outlet, which is assigned to the hydraulic fluid reservoir space and via which the hydraulic pressure generator is able to suction hydraulic fluid out of the hydraulic fluid reservoir space.

4. The hydraulic control unit according to claim 2, wherein the base surface of the end cap extends away from the hydraulic fluid reservoir.

5. The hydraulic control unit according to claim 1, wherein the hydraulic fluid reservoir includes at least one ventilation inlet for ventilating the air space, wherein the at least one ventilation inlet is connectable and/or connected to the interior space of the hydraulic control unit.

6. The hydraulic control unit according to claim 5, wherein the air space is connectable and/or connected to the interior space of a housing of the hydraulic control unit via the at least one ventilation outlet.

7. The hydraulic control unit according to claim 5, wherein the air space is connectable and/or connected to the interior space of a housing of an electric control unit of the hydraulic control unit, via the at least one ventilation outlet.

8. The hydraulic control unit according to claim 5, wherein the air space is connectable and/or connected to the interior space of a housing of a motor of the hydraulic control unit via the at least one ventilation outlet.

9. The hydraulic control unit according to claim 1, wherein the hydraulic control unit includes at least one venting path, which is connectable and/or connected, on the one hand, to the air space, and, on the other hand, to the interior space.

10. The hydraulic control unit according to claim 1, wherein the interior is separated from the atmosphere surrounding the hydraulic control unit.

11. A hydraulic motor vehicle braking system including the hydraulic control unit according to claim 1, wherein the hydraulic motor vehicle braking system has a redundant brake pressure control and further comprises:
   a first functional unit, including a first, electric, brake pressure generator, which is designed to generate a brake pressure at each of a plurality of wheel brakes; and
   a second functional unit, which is designed to lead through a brake pressure at each wheel brake of the plurality of wheel brakes redundantly with respect to the first functional unit, wherein the second functional unit includes the hydraulic control unit according to claim 1.

12. The hydraulic control unit according to claim 1, wherein a volume of the interior space is greater than a volume of the air space.

13. The hydraulic control unit according to claim 1, wherein the hydraulic control unit includes at least one duct, which, on one hand, opens into the air space and, on the other hand, opens into a supply path, between the interior space of a housing of an electric control unit and the interior space of the housing of a motor.

14. The hydraulic control unit according to claim 13, wherein the sealing element for sealing the air space and the interior space of the housing of the electric control unit with respect to each other is provided in a path section of the supply path between a mouth of the at least one duct and the interior space of the housing of the electric control unit.

15. The hydraulic control unit according to claim 13, wherein the sealing element for sealing the air space and the interior space of the housing of the motor with respect to each other is provided in a path section of the supply path between a mouth of the at least one duct and the interior space of the housing of the motor.

16. The hydraulic control unit according to claim 1, wherein the hydraulic control unit includes a bore, wherein the piston of the hydraulic fluid reservoir is movingly, accommodated in the bore, and wherein the bore delimits the hydraulic fluid reservoir space and the air space.

17. The hydraulic control unit according to claim 1, wherein the hydraulic control unit and/or the hydraulic fluid reservoir include(s) a cylinder, wherein the piston of the hydraulic fluid reservoir is movingly, accommodated in the cylinder, and wherein the cylinder delimits the hydraulic fluid reservoir space and the air space.

18. The hydraulic control unit according to claim 16 wherein the piston is sealed via a piston sealing element with respect to the bore and the cylinder.

19. The hydraulic control unit according to claim 18, wherein the piston sealing element seals the hydraulic fluid reservoir space and the air space with respect to each other.

20. The hydraulic control unit according to claim 1, wherein the piston is designed to separate the air space from the interior space of the hydraulic control unit, wherein the hydraulic fluid reservoir is in a condition in which the hydraulic fluid reservoir is filled and/or charged with hydraulic fluid.

21. The hydraulic control unit according to claim 1, wherein the piston is designed to connect the air chamber to the interior space of the hydraulic control unit by means of an axial movement of the piston to empty and/or discharge the hydraulic fluid present in the hydraulic fluid reservoir space.

22. The hydraulic control unit according to claim 1, wherein the hydraulic fluid reservoir is acted upon, by suctioning in the hydraulic fluid by the hydraulic pressure generator.

23. The hydraulic control unit according to claim 1, wherein the hydraulic fluid reservoir is acted upon, by atmospheric pressure.

24. The hydraulic control unit according to claim 18, wherein the piston sealing element includes a circumferential sealing lip that protrudes over the circumferential surface of the piston.

\* \* \* \* \*